C. H. VIDAL.
ELECTRIC LIGHTING AND HEATING OF RAILWAY AND OTHER VEHICLES.
APPLICATION FILED SEPT. 3, 1915.
1,241,310.
Patented Sept. 25, 1917.
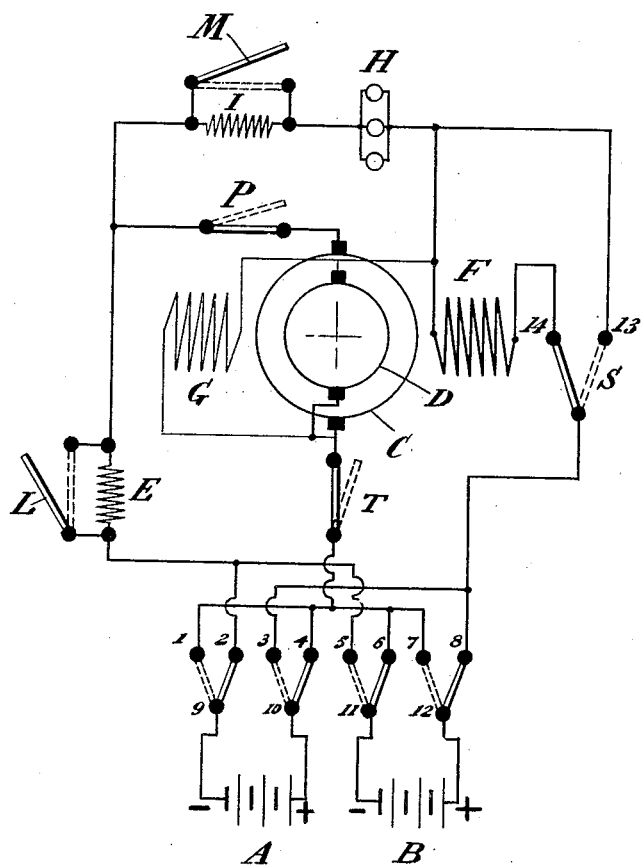
Witnesses:
Inventor
Charles H. Vidal
by
James L. Norris
Attorney

UNITED STATES PATENT OFFICE.

CHARLES HENRY VIDAL, OF LONDON, ENGLAND.

ELECTRIC LIGHTING AND HEATING OF RAILWAY AND OTHER VEHICLES.

1,241,310.

Specification of Letters Patent. Patented Sept. 25, 1917.

Application filed September 3, 1915. Serial No. 48,866.

*To all whom it may concern:*

Be it known that I, CHARLES HENRY VIDAL, a subject of the King of Great Britain, residing in London, England, have invented certain new and useful Improvements in the Electric Lighting and Heating of Railway and other Vehicles, of which the following is a specification.

This invention relates to electric apparatus for supplying lighting or heating circuits or other translating devices with energy at substantially constant potential even when the speed of the dynamo electric generator varies widely, as for example in the case of a dynamo driven from a railway train axle.

The invention may in a sense be regarded as an improvement in the system of train lighting described in British patent specification No. 14059 of 1907, in that the dynamo electric generator is excited by a current caused by the difference of pressure of an independent source and the pressure produced in the generator, the independent source being usually and preferably one half of a divided storage battery, one half of which is being charged from the generator while the other half is operating as a regulator.

The arrangement of apparatus which constitutes the present invention enables half the number of cells to be used for the same potential on the load circuit. In this arrangement the two halves of the battery are connected in series with each other as regards the load circuit and the generator is provided with two armatures and commutators which are mounted on the same spindle or are mechanically coupled and have a common field system, but are otherwise separate and independent, the armatures being also connected in series with each other and the load circuit. Further the two armatures are connected across the respective halves of the battery, one armature being wound to give approximately the normal pressure of half the battery, while the other armature is wound to give a somewhat higher pressure for the purpose of charging the battery— one half at a time. In order that the two sections of the battery may have as nearly as possible the same degree of charge, provision may be made for interchanging the functions of the two sections and their relations with the two armatures when desired, *e. g.* the interchange may be effected automatically after every stoppage of the train.

The invention is illustrated diagrammatically in the accompanying drawing, wherein A, B denote the two battery sections, C, D the two armatures which are mounted upon a common spindle driven from an axle of the vehicle and which are provided with separate commutators and brushes.

Assuming a battery of twelve cells so that the normal voltage of each battery section will be 12 volts the armature D would be wound to give a pressure of 12 volts and the armature C, which may be called the charging armature, a pressure of 15 volts. A limiting resistance E is interposed between the armature C and the battery section A with the ends of which this armature is connected. The regulating field coil F is connected in series with battery section B and armature D and an additional field winding G, consisting of a shunt coil which may be connected across the terminals of armature D or across those of armature C, is provided so that the field of the generator may be built up even when the battery is completely discharged, or its resistance abnormally increased, in the manner described in British patent specification No. 24552 of 1911.

The load circuit indicated at H is connected in series with the two armatures C, D a resistance I being interposed to absorb the excess pressure which armature C is designed to give for the charging purposes.

The action is as follows: When the dynamo is running and charging one-half battery, the switches L and M across the resistances E and I are open, a switch S is connected to terminal 14, switches P and T are closed. Battery switches 9, 10, 11, 12 are connected either to terminals 2, 4, 6, 8 or to terminals 1, 3, 5, 7, according as battery A or battery B is being charged. Assuming that battery A is being charged and battery B is regulating the voltage applied to the load, current passes from the lower terminal of dynamo C to lower terminal of dynamo D, upper terminal of D, load H, resistance I, switch P to upper terminal of dynamo C. Charging current also passes over switch T to terminal 4, battery A, terminal 2, resistance E to switch P and upper terminal of dynamo C. Current energizing the field coils F passes from upper terminal of dynamo D, coils F, terminal 14, terminal 8, battery B, switch T, to lower terminal of dynamo D.

If the dynamo stops, or the speed falls below a predetermined value, a centrifugal governor closes switches L and M, opens P and T, changes switch S to contact 13. The dynamos are now disconnected and both halves of the divided battery are in series with the load.

At each disconnection of the dynamos the battery terminals are changed over from contacts 2, 4, 6, 8 to 1, 3, 5, 7 or vice versa.

Having thus described the nature of the said invention and the best means I know of carrying the same into practical effect, I claim:—

In combination, a dynamo driven from an axle of a train, the said dynamo having two armature windings electrically separated and two commutators with a common field, the armature windings being in series with each other and with the external load, one of the said windings generating an electromotive force sufficient to charge one half of the divided battery, the other half of which serves to control the voltage delivered to the external load, and a battery of cells adapted in series to suitably energize the external load, when the train is at a standstill.

In testimony whereof I have signed my name to this specification in the presence of two subscribing witnesses.

CHARLES HENRY VIDAL.

Witnesses:
 JOSEPH MILLARD,
 WALTER J. SKERTEN.